ent Office 3,131,060
Patented Apr. 28, 1964

3,131,060
ELECTROPHOTOGRAPHIC MATERIAL
Paul Maria Cassiers, Mortsel-Antwerp, and René Maurice Hart, Wilrijk-Antwerp, Belgium, assignors to Gevaert Photo Producten N.V. Mortsel, Belgium, a Belgian company
No Drawing. Filed Feb. 26, 1960, Ser. No. 11,130
Claims priority, application Great Britain Feb. 26, 1959
2 Claims. (Cl. 96—1)

The present invention relates to an electrophotographic material, and more particularly to an electrophotographic material consisting of a support and a photoconductive layer which contains an organic polymeric photoconductive substance or which consists of an organo polymeric photoconductive substance.

Electrophotographic materials are already known which consist of a support and a photoconductive layer containing as photoconductor an inorganic substance such as selenium or zinc oxide or an organic substance such as anthracene, benzidine or a heterocyclic compound of a determined type.

Now we have found that electrophotographic material with particularly favorable properties and suitable to be used in the application of the most widely varying electrophotographic reproduction methods is obtained if in the manufacture of the photoconductive layer polymeric compounds are used containing or consisting of recurring groups corresponding to the general formula:

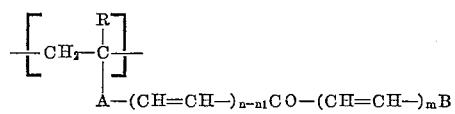

wherein A represents an aromatic nucleus such as e.g. a benzene nucleus or a heterocyclic nucleus such as a carbazole nucleus; B represents an aromatic nucleus such as e.g. a benzene, a naphthalene or anthracene nucleus, or a heterocyclic nucleus such as e.g. a carbazole, phenothiazine or quinoline nucleus; R represents a hydrogen atom or a lower alkyl radical such as e.g. a methyl radical; $n$ and $m$ each represents a positive integer from 1 to 2.

A representative although not limitative list of vinyl polymers containing or consisting of recurring groups corresponding to the above general formula, and suitable in the manufacture of the electrophotographic material according to the present invention, is given below:

Poly(vinylbenzalacetophenone)
Poly(vinylcinnamal acetophenone)
Poly(vinylanisal acetophenone)
Reaction product of poly(vinylacetophenone) and p-dimethylamino cinnamaldehyde
Reaction product of poly(vinylacetophenone) and 1-naphthaldehyde
Reaction product of poly(vinylacetophenone and 9-anthraldehyde
Reaction product of poly(vinylacetophenone and N-ethylcarbazole-2-aldehyde
Reaction product of poly(vinylacetophenone and N-methylphenothiazine-3-aldehyde
Reaction product of poly(vinylacetophenone and quinoline-2-aldehyde
Poly(p-vinylbenzolactone)
Reaction product of poly(N-vinylacetylcarbazole) and N-ethylcarbazole-2-aldehyde
Reaction product of poly(N-vinylacetylcarbazole) and N-methylphenothiazine-3-aldehyde The vinyl polymers and copolymers listed hereinbefore can be prepared by application of one of the various known polymerization procedures, e.g. by pearl or emulsion polymerization or by polymerization in solution, whereby the initiation of the polymerization can occur by free radicals, by ion formation, or by radiation e.g. with actinic light. It is to be noted that the polymerization degree is not critical and can vary between wide limits.

The preparation of some of the polymers and copolymers listed above is described hereinafter by way of example; the polymers and copolymers can be prepared in an analogous manner by application of polymerization techniques generally known to those skilled in the art.

(1) PREPARATION OF THE REACTION PRODUCT OF POLY(VINYLACETOPHENONE AND 9-ANTHRALDEHYDE

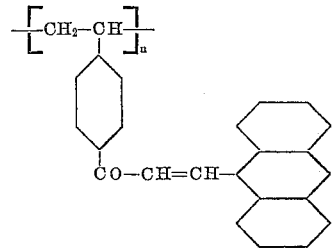

4 g. of poly(vinylacetophenone) are added to a filtered solution of 11.5 g. of 9-anthraldehyde in 50 cm.³ of dioxane. Once this polymer dissolved, 2 cm.³ of an aqueous benzyl trimethyl ammonium hydroxide solution 40% is added dropwise to the solution obtained. After 30 minutes storing at room temperature 0.3 cm.³ of acetic acid is added. After precipitation by pouring out into methanol, sucking off, twice dissolving in methylene chloride and again precipitating in methanol, the polymer is sucked off and dried. Yield: 7.2 g. C, percent found: 87.7; H, percent found: 5.6; O, percent found: 6.3.

(2) PREPARATION OF THE REACTION PRODUCT OF POLY(VINYLACETOPHENONE) AND N-ETHYLCARBAZOLE-2-ALDEHYDE

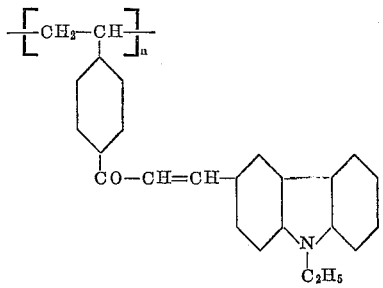

1 g. of polyvinylacetophenone and 3.1 g. of N-ethylcarbazole-2-aldehyde are dissolved in 10 cm.³ of dioxane. Afterwards whilst stirring and at room temperature 0.5 cm.³ of an aqueous benzyl trimethyl ammonium hydroxide solution 5% are added. Stirring is continued for 1½ h. and then 0.1 cm.³ of acetic acid is added. After precipitating in methanol, filtering, dissolving the precipitate obtained in methylene chloride and again precipitating in methanol, the polymer is sucked off and dried. Yield: 1.4 g. N, percent found: 1.9.

(3) PREPARATION OF THE REACTION PRODUCT OF POLY(N-VINYLACETYLCARBAZOLE) AND N-METHYLPHENOTHIAZINE-3-ALDEHYDE

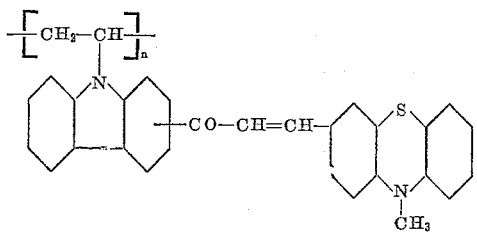

36 g. of N-methylphenothiazine-3-aldehyde are dissolved in 500 cm.³ of methylene chloride. Then 20 g. of acetylated poly(N-vinylcarbazole) are dissolved in this solution. The solution obtained is diluted with 200 cm.³ of dioxane and whilst stirring at room temperature 20 cm.³ of an aqueous benzyltrimethyl ammonium hydroxide solution 40% are added. After 2½ h. stirring 5 cm.³ of acetic acid are added. After precipitating the polymer formed by pouring out into methanol, sucking off, dissolving in methylene chloride and filtering, the filtrate is poured out into methanol. Finally, the precipitated polymer is sucked off and dried. Yield: 18.75 g. S, percent found: 1.2.

(4) PREPARATION OF THE REACTION PRODUCT OF POLY(VINYLACETOPHENONE) AND N-METHYL-PHENOTHIAZINE-2-ALDEHYDE

To a solution of 13.6 g. of N-methyl-phenothiazine-2-aldehyde and 4 g. of polyvinyl-acetophenone in 40 cm.³ of dioxane, 4 cm.³ of an aqueous solution 40% of benzyl-trimethyl ammonium hydroxide are dropwise added. The mixture is reacted for 20 minutes, neutralized with 0.6 cm.³ of acetic acid, diluted with 40 cm.³ of dioxane and poured into 1 litre of methanol. The precipitate obtained is washed with methanol and purified by dissolving in methylene chloride and precipitating in methanol.

The electrophotographic material according to the present invention comprises a suitable support provided with a photoconductive layer containing at least one of the polymeric substances containing or consisting of structural units according to the general formula given above, or mainly consisting of at least one of such polymeric substances.

For the preparation of the electrophotographic material according to the present invention various techniques can be applied when coating the support with a photoconductive layer.

In practice, the polymeric substances involved, either alone or together with other additives such as those described more specifically hereinafter are preferably first dissolved or dispersed in a suitable organic solvent such as for instance benzene, acetone, methylene chloride, dioxane, dimethylformamide or glycol monomethylether, or in a mixture of two or more of such solvents. The solution or dispersion thus obtained is uniformly spread on a surface of a suitable support, for instance by centrifuging, spraying, brushing, or coating whereafter the layer formed is dried in such a way that a uniform photoconductive layer is formed on the surface of the support. It is to be understood that the invention is not limited to the procedure of using the polymeric substances involved in the form of prepolymerized substances; for example monomeric or blends of monomeric and polymeric substances may be applied to the surface to be coated, and polymerized, condensed or cross-linked in situ by any of the methods well known in the art of polymer chemistry.

The thickness of the photoconductive layers is not critical, but is open to choice within a wider range according to requirements in each individual case. Good results are attained with photoconductive layers of a thickness between 1 and 20µ preferably 3 and 10µ. Layers which are too thin do not have a sufficient insulating power and layers which are too thick require extensive exposure-times.

It has been stated that the photoconductive layers mainly consisting of polymeric substances containing or consisting of recurring units of the general formula given above, firmly adhere to the supports whereupon they have been applied.

The photoconductive layers according to the present invention show a very good sensitivity for light of the visible range of the spectrum, in most cases, these sensitivities show a maximum laying between 500 and 580mµ. This property is particularly favorable for obtaining a good reproduction of the colors occurring in the field of document reproduction.

The photoconductive layers according to the present invention may contain, besides one or more of the compounds polymeric substances containing or consisting of structural units of the general formula given above, still one or more other photoconductive monomeric or polymeric compounds with similar or different photoelectric, mechanical or other physical properties.

In this way, it has been found that a mixture of one of the polymeric substances containing or consisting of structural units of the general formula given above, with photoconductive polymeric substances such as those disclosed in the U.S. patent application Serial No. 11,129, filed February 26, 1960 (title, "Electro-Photographic Material"), show a higher sensitivity than the maximum sensitivity which can be reached by using each of these polymeric substances separately. In this respect favorable results are attained with layers consisting of 1 to 33% of the polymeric substances according to the present invention and 99 to 67% of one or more of the polyvinyl polymers or vinyl-copolymers containing or consisting of N-vinylcarbazole units according to the copending application Serial No. 11,129 filed February 26, 1960.

Further, according to the present invention, monomeric compounds which themselves possess either or not photoconductive properties and which cause an increase of the general sensitivity and/or of the sensitivity to electromagnetic rays from a determined part of the spectrum can also be present in the photoconductive layers.

Compounds operable for increasing the general sensitivity and/or the sensitivity to electromagnetic rays from the visible part of the spectrum are preferably used in an amount of 0.1 to 5% in respect of the weight of the polymeric photoconductive substances used. Compounds from which useful sensitizing effects have been obtained include—

Arylmethane dyestuffs such as for instance: Violet Fuchsine (C. I. 42,510), Bleu Verdatre (C. I. 689), Vert Solide Nouveau 3B (C. I. 42,025), Erythrosine 2 Na (C. I. 773), Rhodamine B 500 (C. I. 45,170), Fanal Pink B (C. I. 45,160), Rhodamine 6 GDN (C. I. 45,160), Auramin (C. I. 41,000), Pyronin G (C. I. 45,005).

Polymethine dyestuffs such as for instance: 3,3'-diethyl-thiacarbocyanine iodide,

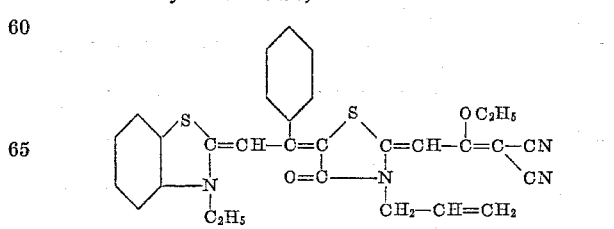

Azo-dyestuffs such as for instance: Eriochrome Blue Black R (C.I. 15,705)

Azomethine-dyestuffs such as for instance: bis(p-dimethylaminobenzal)-azine

Carbonyl-dyestuffs such as for instance: chloroanil, Solway Ultra Blue B (C.I. 62,055), Alizarine Cyaninegroen GWA (C.I. 61,590)

Polycyclic compounds such as for instance: nitro-pyrene, N,N' - di - (beta - naphthyl) - p - phenylenediamine, phenanthrene, anthracene, acenaphthene Phthalocyanine-dyestuffs such as for instance: Segnale hight Turquoise NB (C.I. 74,160)

Heterocyclic compounds such as for instance: N,N'-pentamethylene-bis(benzthiazole)-perchlorate.

Finally there can be present in the photoconductive layer other monomeric or polymeric compounds which confer the properties desired to the photoconductive layer and/or to the coating composition wherefrom this layer is formed.

In this way, plasticizers such as dibutylphthalate, dimethylphthalate, dimethylglycolphthalate, tricresylphosphate, triphenylphosphate, monocresyldiphenylphosphate etc. may be added to the polymeric substances used in the photoconductive layer in amounts of 10 to 30% of the polymer weight.

Other additives, well known in the art of coating technique, which may be used, include pigments, and agents controlling viscosity, free flow, aging and thermal stability, oxidation and/or gloss. In selecting such additives, preference is given to those substances which do not markedly impair the dark resistivity of the photoconductive layer.

In the manufacture of the electrophotographic material according to the present invention is preferably used as support for the photoconductive layer an electrically conductive plate or sheet, or an insulating plate or sheet provided with an electrically conductive layer. Under electrically conductive plate, sheet or layer is understood a plate, sheet or layer the specific resistivity of which is smaller than that of the photoconductive layer, i.e. in general smaller than $10^9$ ohm-cm. Supports the specific resistivity of which is smaller than $10^5$ ohm-cm. are preferably used.

Suitable insulating plates are e.g. glass plates; these plates must be coated with a conductive layer, e.g. with a transparent layer of silver, gold or stannous oxide deposited thereon e.g. by vacuum evaporation.

Suitable insulating sheets are for instance films of synthetic macromolecular substances with high specific resistivity such as for instance the polysulphonates described and claimed in the copending U.S. patent application Serial No. 797,587, filed March 6, 1959, polyesters such as those described and claimed in the copending U.S. patent applications Serial No. 702,252, filed December 12, 1957, Serial No. 725,498, filed April 1, 1958, Serial No. 731,874, filed April 30, 1958, polystyrene, polyethylene, cellulose esters etc. or sheets of paper with high specific resistivity. The insulating sheets must be provided with a conductive coating e.g. with a thin metal sheet, with a layer comprising a metal powder dispersed in the smallest possible amount of binding agent, or with a thin hydrophilic layer comprising a hygroscopic and/or antistatic compound and a hydrophilic binding agent. Suitable hygroscopic and/or antistatic compounds are for instance glycerine, glycol, polyethylene glycols, calcium chloride, sodium acetate, condensation products of maleic acid and polyethylene glycols, citric acid amides, hydroxypropyl sucrosemonolaurate, quaternary ammonium compounds, amine salts of lyophilic alkylphosphates, lyophilic dialkylpolyoxyalkylene phosphates and polyoxyalkyleneamides. Suitable hydrophilic binding agents are for instance gelatin, glue, polyvinyl alcohol, methylcellulose, carboxymethylcellulose, cellulosesulphate, cellulose hydrogen phthalate, cellulose-acetatesulphate, hydroxyethyl cellulose, polyacrylic acid or colloidal silica; for obtaining a good adhesion of the hydrophilic layer and the hydrophobic polymeric sheet, the polymeric sheet can be provided with a suitable subbing layer such as for instance one of the subbing layers described in the copending U.S. patent application Serial No. 509,333, filed May 18, 1955 (for polyester films), the British Patent 819,592, the copending patent application U.S. Serial No. 826,129, filed July 10, 1959, and the Belgian Patent No. 569,129 (for polyalkylene films), U.S. Patent 2,867,542 (for Cellulose Ester Films), and the Belgian Patent No. 573,005 (for Hydrophilic Layers With Polyvinyl Alcohol as Binding Agent).

Suitable conductive plates are for instance plates of metals such as aluminum, zinc, copper, tin, iron or lead.

Suitable conductive sheets are for instance films made of polymeric substances with low specific resistivity such as for instance polyamide films or paper sheets with low specific resistivity. Good results can be attained by using paper sheets containing hygroscopic and/or antistatic substances as described hereinbefore. These hygroscopic and antistatic substances are preferably incorporated into the paper sheets during the paper manufacturing process either by adding them to the paper pulp or by an aftertreatment, before or after calendering the paper sheets. These substances can likewise be incorporated into the paper sheets by applying to the raw paper stock a composition containing the hygroscopic and/or the antistatic substances and a hydrophilic binding agent as described hereinbefore.

It was likewise stated that particularly good results are attained when using paper sheets with low specific resistivity provided with a coating of a polymeric substance in order to obtain a smooth surface and to prevent the organic liquid wherein the photoconductive substance is dissolved from penetrating within the paper sheet. This coating, however, must not prevent the carrying-off of the electrons from the exposed image areas during the irradiation. Suitable coatings are for instance coatings with a thickness of 2 to $10\mu$ and composed of one or more of macromolecular compounds such as e.g. natural resins, such as dammar resin, elemi-resins, gum arabic, manilla gum and sandarac resin; micro-crystalline waxes, modified natural substance such as cellulose diacetate and cellulose triacetate, cellulose acetobutyrate, ethyl cellulose, ethyl cellulose stearate or other cellulose derivatives pentaerythrite polyesters or other modified colophonium resins and ester gums; polymerisates such as polyethylene, polystyrene and copolymers of styrene, polyvinylacetate and copolymers of vinylacetate, polyvinylacetals of formaldehyde, acetaldehyde, butyraldehyde, polyacrylic acid esters and polymethacrylic acid esters and coumarone-indene resins; and polycondensates such as glycerol-phthalate resins and other glyceryl polyesters, alkyd resins, polyethylene glycol esters, diethylene glycol polyesters, formaldehyde resins and silicone resins. If desired plasticizers can be added such as for instance dibutylphthalate, dimethylphthalate, dimethylglycol phthalate, tricresylphosphate, triphenylphosphate and monocresyldiphenylphosphate etc. Especially good results were attained when using polysulphonates such as those described in the copending U.S. patent application Serial No. 797,587, filed March 6, 1959, and the polyesters disclosed in the copending U.S. patent applications Serial No. 702,252, filed December 12, 1957, Serial No. 725,498, filed April 1, 1958, Serial No. 731,874, filed April 30, 1958.

Besides the usual paper sorts can likewise be used synthetic paper sorts such as those prepared from polyester fibers from terephthalic acid and glycols, from polyamide fibers or nylon-fibers or from polyacrylonitrile fibers. Before coating the photoconductive layers on such paper sheets, the latter are preferably impregnated with substances enhancing their conductivity, for instance polycaprolactam, the polyester of 2,5-di-(p-oxyphenyl)-1,3,4-oxadiazole and 1-chloro-3-aminobengene-4,6-disulphochloride, a copolyamide of hexamethylenediamine, caprolactam, adipic acid and sebacic acid, N-methylene polyhexamethylene adipamide or polyamides.

Electrophotographic materials according to the present invention can be used in any of the different techniques whatever which are based on the exposure and the discharge of an electrostatic charge provided in or on a photoconductive layer.

The electrostatic charging of the photoconductive layer according to the present invention can be effected according to one of the methods known in electrophotography, for instance by friction with a smooth material, by friction with a material possessing a high electric resistivity such as for instance a cylinder coated with polystyrene, by corona discharge, by contact charge or by discharge of a capacitor. A positive charge applied at the rear side of the printing material gives about the same result as a negative charge at the front side.

The electrophotographic material is thereafter imagewise exposed to a suitable electromagnetic radiation whereby the radiated parts of the layer are image-wise discharged and an electrophotographic latent image is obtained. The electrostatic latent image formed is then converted into a visible image either on the electrophotographic material whereon the latent image was formed, or on a material onto which the electrostatic latent image was transferred for instance by application of the method as described in the Belgian Patent No. 529,234.

The conversion of the original or transferred latent image into a visible image can occur according to one of the techniques known in electrophotography wherein use is made of the electrostatic attraction or repulsion of finely divided colored substances which for instance are present in a powder mixture, in an electric insulating liquid (for instance in the form of suspension) or in a gas (for instance in the form of aerosol), or of finely divided colored liquid drops which are for instance present in an electrically insulating liquid (for instance in the form of dispersion) or gas (e.g. in the form of aerosol).

By suitable choice of the sign of the charge of the developing powder or developing liquid a negative or positive print can be obtained at will from any original. If both the printing material and developing powder or developing liquid bear the same charge sign; the powder will only adhere to the discharged areas and a print (positive/positive) is obtained with the same image value as the original. If the sign of the material and of the developing powder or developing liquid is different, the image values become reversed (negative/positive).

Besides development according to the methods generally known in the electrophotography, also other techniques can successfully be used for instance by applying the method according to the copending patent application Serial No. 856,357, filed December 1, 1959, and the copending patent application Serial No. 741,017, filed June 10, 1958.

If a colored powder was used for making visible the latent image, the visible image obtained can, if necessary, be fixed according to one of the methods known in electrophotography, e.g. by heating, or it can be transferred onto another support, for instance according to the method described in the British Patent 658,699 and fixed thereon.

Evidently, the present invention is by no means limited to one or the other particular embodiment as regards the use of the new electrophotographic materials, and the exposure technique, the charging method, the transfer (if any), the developing method, and the fixing method as well as the materials used in these methods can be adapted to the necessities.

Electrophotographic materials according to the present invention can be applied in reproducing techniques wherein different kind of radiations, electromagnetic radiations as well as nuclear radiations are used. For this reason, it should be pointed out that although the invention is mainly intended for being applied in connection with methods comprising an exposure, the term "electrophotography" wherever appearing in the description and the claims, must be broadly understood and comprises both xerography and xertoradiography.

The following examples illustrate the present invention without limiting, however, the scope thereof.

*Example 1*

To a 90 g./sq. m. paper stock is first applied a layer from a solution consisting of

| | | |
|---|---|---|
| Gelatin | g. | 1 |
| Glycerol | cm.$^3$ | 10 |
| Water | cm.$^3$ | 90 | and dried. Then a 10% solution of the reaction product of poly(vinyl-acetophenone) and N-methylphenothiazine-3-aldehyde is coated on this layer. The dried layer is 11µ thick. After drying and charging, this layer is exposed through a negative for 15 seconds to a tungsten lamp of 100 watts at a distance of 30 cm. After powder development, a clear print is obtained.

*Example 2*

A photographic baryta paper stock is coated with a layer from the following solution:

| | | |
|---|---|---|
| The reaction product of poly(vinylacetophenone) and N-methylphenothiazine-3-aldehyde | g. | 10 |
| Methylene chloride | cm.$^3$ | 100 |
| A 1% Phenosafranin (C.I. 50,200) solution | cm.$^3$ | 2 |

After drying, the thickness of the layer obtained amounts to 11µ. This photographic material is negatively charged with a corona and exposed for 5 seconds through a diapositive with 100 watt lamp at a distance of 10 cm. The latent image formed is made visible by development with the usual resin/iron powder mixture. Such mixtures are described in British specification 679,715 and Belgian Patent 541,668. Very good results are attained by mixing together three parts by weight of pitch, 4 parts of colophonium and 3 parts of carbon black, pulverizing and mixing with 200 parts of iron powder. After fixing by heat a clear print of the original is formed.

*Example 3*

A 100 g./sq. m. baryta paper stock is coated with a layer from the following solution:

| | | |
|---|---|---|
| The reaction product of poly(vinylacetophenone) and N-ethylcarbazole-2-aldehyde | g. | 10 |
| Methylene chloride | cm.$^3$ | 100 |

The dried layer has a thickness of 10µ and is colored pale-yellow. The material is negatively charged with a corona at 6000 volts, placed upon an original with a text on both sides, and exposed reflectographically through its rear side for 40 seconds with a lamp of 100 watts, at a distance of 10 cm. The latent image formed is now made visible by dusting with a powder of the following composition: 100 parts of iron powder 90 Mesh (registered trade name for an iron powder manufactured by the British Drug Houses, Ltd., Poole, England), and 6 parts of Graph-O-Fax Toner No. 4 (registered trade name of Philip A. Hunt Co., Palisades Park, New Jersey). If now in known way an ordinary writing paper is placed onto this powder image, and a negative corona charge is effectuated through the rear of the writing paper, the powder is taken over onto the transfer paper and gives after fixation by heat a strong readable print of the original.

*Example 4*

A baryta paper stock is coated with a layer from the following solution:

| | | |
|---|---|---|
| Reaction product of poly(vinylacetophenone) and 1-naphthaldehyde | g. | 10 |
| Chloranil | g. | 0.5 |
| Brilliant Glacier Blue (C.I. 42,140) | mg. | 10 |
| Methylene chloride | cm.$^3$ | 100 |

The dried layer has a thickness of 6µ. The material obtained is negatively charged with a corona. For printing a diapositive, an exposure of 40 seconds with a lamp of 100 watts is necessary. The latent image formed is developed with a mixture of 100 parts by weight of iron filings and 5 parts of Graph-O-Fax Toner No. 1 (registered trade name for a coloring powder manufactured by Philip A. Hunt Co., Palisades, New Jersey). A strong print of the original is obtained.

*Example 5*

Photographic paper is impregnated with a solution of 5 g. of glycerine in 50 cm.$^3$ of water and 50 cm.$^3$ of ethanol, dried and coated with a layer from the following solution:

| | |
|---|---|
| Reaction product of poly(vinylacetophenone) and 9-anthraldehyde _____g__ | 10 |
| Aniline Red (C.I. 42,510) _____mg__ | 12 |
| Methylene chloride _____cm.$^3$ | 100 |

The dried layer has a thickness of 5μ. The material obtained is positively charged with a corona, exposed for 25 seconds through a diapositive, and finally developed as in Example 4. A strong print of the original is obtained.

*Example 6*

A baryta paper stock is coated with a layer from the following solution:

| | |
|---|---|
| The reaction product of poly(N-vinylacetylcarbazole) and N-methylphenothiazine-3-aldehyde _g__ | 5 |
| Rhodamine B (C.I. 45,170) _____mg__ | 20 |
| Methylene chloride _____cm.$^3$__ | 100 |

The dried layer has a thickness of 8μ. The material obtained is then negatively charged with a corona and exposed with a line original for 5 seconds with a 100 watt lamp at a distance of 10 cm. After development and fixation as in Example 4, a good print of the original is obtained.

*Example 7*

A 90 g./sq. m. paper stock coated with an aluminum foil of a thickness of 8μ is dip-coated with a solution of the following composition:

| | |
|---|---|
| Reaction product of poly(vinylacetophenone) and p-dimethylaminocinnamaldehyde _____g__ | 10 |
| Crystal Violet (C.I. 42,555) _____mg__ | 12 |
| Ethanol _____cm.$^3$__ | 50 |
| Benzene _____cm.$^3$__ | 50 |

The dried layer has a thickness of 9μ. The electrophotographic paper obtained is negatively charged with a corona at 6000 volts and exposed through a diapositive for 10 seconds with a 100 watt lamp at a distance of 10 cm. The latent image formed is now developed with a mixture of iron filings and resin powder and the powder image formed is fixed by heat. A strong print of the original is obtained.

The orange-red colored photoconductive layer has a sensitivity maximum at 550 mμ. By addition of 0.5 g. of chloroanthraquinone to the above mentioned solution of this example, the exposure time is reduced to one half.

*Example 8*

A baryta paper stock is coated with a layer from the following solution:

| | |
|---|---|
| Copolymer of N-vinylcarbazole and methyl methacrylate containing 46.6 mol percent of N-vinylcarbazole _____g__ | 10 |
| Reaction product of poly(vinylacetophenone) and 9-anthraldehyde _____g__ | 0.5 |
| Methylene chloride _____cm.$^3$__ | 100 |

The dried layer has a thickness of 5μ. The material obtained is negatively charged with a corona and subsequently exposed reflectographically with a paper printed on bother sides as original. The exposure time amounts to 19 seconds with a 100 watt lamp at a distance of 10 cm. The latent image formed is made visible by dusting with a mixture of 100 parts by weight of glass beads and 6 parts of Toner P 648 (registered trade name for a xerographic developing dye manufactured by General Photo Products Co., Inc., Chatham, N.J.). The powder image obtained is transferred electorstatically in known way onto writing paper. A strong print of the original is obtained.

A baryta paper coated with a layer from one same solution not containing, however, the reaction product of poly(vinyl-acetophenone) and 9-anthraldehyde, ought to be exposed in similar circumstances five times longer for attaining the same result.

*Example 9*

A baryta paper stock is coated with a layer from the following solution:

| | |
|---|---|
| Copolymer of N-vinylcarbazole and styrene containing 34 mol percent of N-vinylcarbazole _____g__ | 10 |
| Poly(vinylcinnamal-acetophenone) _____g__ | 1 |
| Methylene chloride _____cm.$^3$__ | 100 |

After drying the layer, charging up the electrophotographic material obtained and subsequent proceeding according to the preceding example, a strong print of the original is obtained.

A baryta paper stock coated with a layer consisting only of the copolymer of this example requires a 7 times stronger exposure.

*Example 10*

A barta paper stock is coated with a layer from the following:

| | |
|---|---|
| Copolymer of N-vinylcarbazole and vinyl acetate containing 77.6 mol percent of N-vinylcarbazole _____g__ | 9.6 |
| Reaction product of poly(vinylacetophenone) and 1-naphthaldehyde _____g__ | 0.4 |
| Methylene chloride _____cm.$^3$__ | 100 |

After drying the layer, charging up the electrophotographic material obtained and subsequent proceeding according to Example 8, a strong print of the original is obtained.

A baryta paper stock with a layer consisting only of the copolymer of this example requires a 6 times stronger exposure.

*Example 11*

On a series of baryta paper strips are coated different solutions in methylene chloride of N-vinylcarbazole and the reaction product of poly(vinylacetophenone) and N-methylphenothiazine-3-aldehyde in increasing ratios and in such a way that after drying they have the same thickness. The materials obtained are electrostatically charged with a corona and exposed through a photographic wedge with a constant of 0.1. Development is carried out with a mixture of 5 g. of Toner P 648 (registered trade name) and 100 g. glowed iron powder. By glowed iron powder is meant iron powder which has been degreased with alcohol and which has been heated for at least 5 min. at 600–700° C. It has been stated that the sensitivity of the electrophotographic material is proportional with the amount of the reaction product of poly(vinylacetophenone) and N-methylphenothiazine-3-aldehyde used, reaches a maximum value and decreases thereafter. If the relative light-sensitivity of poly(N-vinylcarbazole) is 1, the sensitivity of the reaction product of poly(vinyl-acetophenone) and N-methylphenothiazine-3-aldehyde is 6 and that of a composition consisting of poly(N-vinylcarbazole) and the reaction product of poly(vinylacetophenone) and N-methylphenothiazine-3-aldehyde in a ratio of 8 to 1 amounts to 120.

Example 12

A baryta paper stock is coated with a layer from the following solution:

| | |
|---|---|
| Copolymer of N-vinylcarbazole and lauryl methacrylate containing 81.8 mol percent of N-vinylcarbazole _____ g__ | 9.5 |
| Reaction product of poly(vinylacetophenone) and ethyl carbazole-2-aldehyde _____ g__ | 0.5 |
| Methylene chloride _____ cm.³__ | 100 |

After drying, charging by means of a corona and exposure, it appears that the electrophotographic layer obtained is 4 times as sensitive as the layer containing but the copolymer of N-vinylcarbazole and lauryl methacrylate.

Example 13

A baryta paper stock is coated with a layer from the following solution:

| | |
|---|---|
| Copolymer of N-vinylcarbazole and isopropenylacetate containing 90 mol percent of N-vinylcarbazole _____ g__ | 9.9 |
| Reaction product of poly(N-vinylacetylcarbazole) and N-ethylcarbazole-2-aldehyde _____ g__ | 0.1 |
| Methylene chloride _____ cm.³__ | 100 |

After drying, charging by means of a corona and exposure, it appears that the electrophotographic layer obtained is 5 times as sensitive as the layer containing but the first copolymer.

Example 14

A baryta paper stock is coated with a layer from the following solution:

| | |
|---|---|
| Poly(N-vinylcarbazole) _____ g__ | 9.5 |
| Reaction product of poly(N-vinylacetylcarbazole) and N-methylphenothiazine-3-aldehyde _____ g__ | 0.5 |
| Methylene chloride _____ cm.³__ | 100 |

After drying, charging with a corona and exposure, it appears that the electrophotographic layer obtained is 10 times as sensitive as the layer containing but poly(N-vinylcarbazole).

We claim:

1. An electrophotographic copying process which comprises exposing an electrostatically charged photoconductive insulating layer comprising a solid organic polymer of the monomer $$CH_2=\overset{R}{\underset{|}{C}H}$$
$$A-(CH=CH-)_{n-1}CO-(CH=CH-)_mB$$

wherein A is a divalent radical selected from the group consisting of an aromatic nucleus and a heterocyclic nucleus, and B is a monovalent radical selected from the group consisting of an aromatic nucleus and a heterocyclic nucleus, R represents a member selected from the group consisting of a hydrogen atom and a lower alkyl radical, and $n$ and $m$ each represents a positive integer from 1 to 2, to a light image whereby the light-struck area is discharged, and developing said image of electrostatic charges with an electroscopic material.

2. The electrophotographic copying process of claim 1 wherein the photoconductive insulating layer contains from about 0.5 to about 5%, based on the weight of said organic polymer, of a material to increase the light sensitivity of said layer.

References Cited in the file of this patent

UNITED STATES PATENTS

| | | |
|---|---|---|
| 2,709,140 | Michalek | May 25, 1955 |
| 2,716,103 | Unruh et al. | Aug. 23, 1955 |
| 2,747,997 | Smith et al. | May 29, 1956 |
| 2,811,510 | Leubner | Oct. 29, 1957 |
| 2,860,048 | Deubner | Nov. 11, 1958 |
| 2,956,878 | Michiels | Oct. 18, 1960 |
| 3,011,918 | Silvernail | Dec. 5, 1961 |

FOREIGN PATENTS

| | | |
|---|---|---|
| 1,068,115 | Germany | Oct. 29, 1959 |